(12) United States Patent
Jordan, Jr. et al.

(10) Patent No.: US 10,590,318 B2
(45) Date of Patent: Mar. 17, 2020

(54) MULTI-PART POLYURETHANE COMPOSITIONS, ARTICLES THEREOF, AND METHOD OF MAKING

(71) Applicant: ELANTAS PDG, INC., St. Louis, MO (US)

(72) Inventors: Richard David Jordan, Jr., Allegany, NY (US); Michael Causer, Roulette, PA (US); Tanmoy Dey, Olean, NY (US)

(73) Assignee: Elantas PDG, Inc., St. Louis, MO (US)

( * ) Notice: Subject to any disclaimer, the term of this patent is extended or adjusted under 35 U.S.C. 154(b) by 757 days.

(21) Appl. No.: 14/950,208

(22) Filed: Nov. 24, 2015

(65) Prior Publication Data

US 2016/0145476 A1 May 26, 2016

Related U.S. Application Data

(60) Provisional application No. 62/084,635, filed on Nov. 26, 2014.

(51) Int. Cl.
*C09J 175/08* (2006.01)
*B01D 63/02* (2006.01)
(Continued)

(52) U.S. Cl.
CPC ............ *C09J 175/08* (2013.01); *B01D 63/02* (2013.01); *C08G 18/10* (2013.01);
(Continued)

(58) Field of Classification Search
CPC ........ C09J 175/08; C08K 5/0016; C08K 5/11; C08K 3/34; C08G 18/3206; C08G 18/7671; C08G 18/4829; C08G 18/10; B01D 63/02
See application file for complete search history.

(56) References Cited

U.S. PATENT DOCUMENTS

| | | | |
|---|---|---|---|
| 3,733,426 | A | 5/1973 | Kaufman et al. |
| 3,747,037 | A | 7/1973 | Earing |

(Continued)

FOREIGN PATENT DOCUMENTS

| | | |
|---|---|---|
| CN | 102850989 A | 1/2013 |
| CN | 102911636 A | 2/2013 |

(Continued)

OTHER PUBLICATIONS

International Search Report for International Application No. PCT/US2014/067837; International Filing Date Nov. 29, 2014; dated Feb. 23, 2015; 4 pages.

(Continued)

*Primary Examiner* — Taiwo Oladapo
(74) *Attorney, Agent, or Firm* — Curatolo Sidoti Co., LPA; Salvatore A. Sidoti

(57) ABSTRACT

A multi-part polyurethane composition is composed of a first part comprising a polyurethane prepolymer composition and a second part comprising a polyol having a hydroxyl functionality of 4 to 6, and a desiccant. The composition further comprises a plasticizer, wherein the plasticizer can be present in any one or more of the parts. A polyurethane is formed by mixing and curing the composition. The composition can be used as an adhesive for separatory devices, in particular for potting hollow fibers.

19 Claims, 1 Drawing Sheet

(51) Int. Cl.
*C08K 5/11* (2006.01)
*C08G 18/10* (2006.01)
*C08G 18/32* (2006.01)
*C08G 18/48* (2006.01)
*C08K 5/00* (2006.01)
*C08G 18/76* (2006.01)
*C08K 3/34* (2006.01)

(52) U.S. Cl.
CPC ..... *C08G 18/3206* (2013.01); *C08G 18/4829* (2013.01); *C08G 18/7671* (2013.01); *C08K 5/0016* (2013.01); *C08K 5/11* (2013.01); *C08K 3/34* (2013.01)

(56) References Cited

U.S. PATENT DOCUMENTS

| | | | |
|---|---|---|---|
| 3,962,094 | A | 6/1976 | Davis et al. |
| 4,008,197 | A | 2/1977 | Brauer et al. |
| 4,168,258 | A | 9/1979 | Brauer et al. |
| 4,170,559 | A | 10/1979 | Kroplinski et al. |
| 4,224,164 | A | 9/1980 | Brauer et al. |
| 4,256,617 | A | 3/1981 | Kroplinski et al. |
| 4,267,044 | A | 5/1981 | Kroplinski et al. |
| 4,284,506 | A | 8/1981 | Tetenbaum et al. |
| 4,300,184 | A | 11/1981 | Colla |
| 4,373,081 | A | 2/1983 | Nachtkamp et al. |
| 4,375,521 | A | 3/1983 | Arnold |
| 4,395,530 | A * | 7/1983 | Hammond ........... C08G 18/089 528/44 |
| 4,444,976 | A | 4/1984 | Rabito |
| 4,454,176 | A | 6/1984 | Buckfelder et al. |
| 4,518,631 | A | 5/1985 | Antonen |
| 4,603,188 | A | 7/1986 | Kusakawa et al. |
| 4,842,736 | A | 6/1989 | Bray et al. |
| 4,865,735 | A | 9/1989 | Chu et al. |
| 4,876,303 | A | 10/1989 | Chapin et al. |
| 4,879,032 | A | 11/1989 | Zemlin |
| 4,886,600 | A | 12/1989 | Chu et al. |
| 4,923,756 | A | 5/1990 | Chung et al. |
| 5,266,145 | A | 11/1993 | Duck et al. |
| 5,288,797 | A | 2/1994 | Khalil et al. |
| 5,306,798 | A | 4/1994 | Horn et al. |
| 5,360,543 | A | 11/1994 | Usifer et al. |
| 5,556,934 | A | 9/1996 | Hagquist et al. |
| 5,863,597 | A | 1/1999 | Lynch |
| 5,871,822 | A | 2/1999 | Lepsche et al. |
| 6,130,268 | A | 10/2000 | Murray |
| 6,423,810 | B1 * | 7/2002 | Huang ................... C08G 18/10 525/131 |
| 7,303,675 | B2 | 12/2007 | De La Cruz |
| 7,781,513 | B2 | 8/2010 | Lucas et al. |
| 8,360,390 | B2 | 1/2013 | Fornage |
| 8,822,844 | B1 | 9/2014 | Dimke et al. |
| 2004/0012936 | A1 | 1/2004 | Gravelin |
| 2004/0072953 | A1 | 4/2004 | Hung et al. |
| 2004/0138402 | A1 | 7/2004 | Thiele et al. |
| 2004/0198943 | A1 | 10/2004 | Slack et al. |
| 2005/0073552 | A1 | 4/2005 | Smoot et al. |
| 2006/0076047 | A1 | 4/2006 | Green et al. |
| 2008/0149257 | A1 | 6/2008 | Tribelhorn et al. |
| 2009/0124751 | A1 | 5/2009 | Lucas et al. |
| 2009/0198036 | A1 * | 8/2009 | Duffy |
| 2009/0242123 | A1 | 10/2009 | Zhang et al. |
| 2009/0264614 | A1 * | 10/2009 | Hayashi ............ C08G 18/0871 528/85 |
| 2013/0059082 | A1 | 3/2013 | Wang et al. |
| 2014/0355225 | A1 | 12/2014 | Jordan, Jr. et al. |
| 2015/0077947 | A1 | 3/2015 | Jordan, Jr. et al. |
| 2015/0259465 | A1 * | 9/2015 | Burckhardt et al. |
| 2015/0259583 | A1 | 9/2015 | Kahle et al. |
| 2016/0298009 | A1 | 10/2016 | Dey et al. |

FOREIGN PATENT DOCUMENTS

| | | |
|---|---|---|
| EP | 0037403 A1 | 10/1981 |
| JP | H0657236 A | 3/1994 |
| JP | 2006096912 A | 4/2006 |
| WO | 2004035647 A1 | 4/2004 |
| WO | 2009020774 A1 | 2/2009 |
| WO | 2009039145 A1 | 3/2009 |
| WO | 2009123905 A1 | 10/2009 |
| WO | 2012010559 A1 | 1/2012 |
| WO | WO2014040922 A1 * | 3/2014 |

OTHER PUBLICATIONS

Written Opinion of the International Search Report for International Application No. PCT/US2014/067837; International Filing Date Nov. 29, 2014; dated Feb. 23, 2015; 6 pages.

Wypych; "Plasticizers Use and Selection for Specific Polymers"; ChemTec Laboratories, Inc., Toronto, Canada; Handbook of Plasticizers; Chapter 11; 107 pages; No Date.

International Search Report and Written Opinion for International Application No. PCT/US2015/019882, International Filing Date Mar. 11, 2015, dated Jul. 3, 2015, 11 pages.

International Search Report for International Application No. PCT/US2014/040421, International Filing Date May 31, 2014, dated Aug. 25, 2014, 3 pages.

International Search Report for International Application No. PCT/US2015/062342, International Filing Date Nov. 24, 2015, dated Apr. 7, 2016, 5 pages.

International Search Report for International Application No. PCT/US2016/026347, International Filing Date Apr. 7, 2016, dated Jun. 1, 2016, 6 pages.

Written Opinion for International Application No. PCT/US2014/040421, International Filing Date May 31, 2014, dated Aug. 25, 2014, 6 pages.

Written Opinion for International Application No. PCT/US2015/062342, International Filing Date Nov. 24, 2015, dated Apr. 7, 2016, 5 pages.

Written Opinion for International Application No. PCT/US2016/026347, International Filing Date Apr. 7, 2016, dated Jun. 1, 2016, 5 pages.

* cited by examiner

MULTI-PART POLYURETHANE COMPOSITIONS, ARTICLES THEREOF, AND METHOD OF MAKING

CROSS REFERENCE TO RELATED PATENT APPLICATION

This non-provisional application claims priority to U.S. Provisional Application No. 62/084,635, filed Nov. 26, 2014, which is incorporated herein in its entirety by reference.

BACKGROUND OF THE INVENTION

Polymeric membranes can be used to separate liquid and gaseous streams into their component fractions. Unlike distillation, sublimation, and crystallization, membrane separations operate without heating or cooling. Membranes can be used for the separation of a wide variety of gaseous and aqueous streams, for example air, sea water, waste water, and biological fluids, such as blood. The membranes used to accomplish these separations can be fabricated in various geometries, such as a flat sheet, spiral wound sheet, tubular, and hollow fiber. The membrane shape is usually determined by the nature of the separation that is to be effected. When performing a separation on a viscous liquid mixture, for instance, it can be advantageous to use a membrane in a large diameter tubular configuration in order to maintain fluid velocity and to minimize fouling of the membrane surface. Conversely, when separating fluids with low viscosities, such as gases, the use of membranes in a hollow fiber configuration is more efficient.

The fine hollow fiber geometry is particularly advantageous because it can yield very high surface area-to-volume ratios. Much of this benefit is derived from the fact that a membrane support structure is integral to the hollow fiber, i.e., the membrane is a self-supporting entity. This is in contrast to flat sheet and spiral wound membranes that are typically cast onto a nonwoven fabric, or to tubular membranes that are frequently cast onto a rigid porous backing tube. Thus, a significant portion of the module volume of these membranes is consumed by the membrane support structure.

A tube sheet is a plate, sheet, or bulkhead which is perforated with a pattern of holes designed to accept pipes or tubes. When used to support and isolate hollow fiber filter elements, tube sheets can be fabricated with a liquid resin that subsequently solidifies, often by a chemical curing process. An example of a liquid resin used for casting tube sheets are two part amino-epoxy adhesives.

Two part amino-epoxy adhesives exhibit good dimensional stability and high strength at elevated temperature and in harsh environments, which make them suitable for casting tube sheets. Although amino-epoxy adhesives dominate the filtration market, they exhibit undesirable cure characteristics, including a high peak exotherm temperature. High peak exotherm temperatures can degrade plastic parts, for example hollow fibers, embedded in the adhesive, and can cause hollow fiber embrittlement, which reduces filtration efficacy. Amino-epoxy adhesives are also prone to darken.

Two-part polyurethane adhesives are promising replacements for amino-epoxy adhesives for hollow fiber filtration modules. They exhibit good adhesion to hollow fibers and maintain a fluid-tight relationship between the hollow fibers and the tube sheet, thus preventing unwanted components of the feed stream from mixing with the permeate. However, they are prone to high exotherm temperatures, discoloration, and bubble formation. Attempts to develop two-part polyurethane adhesives having a reduced peak exotherm temperature can result in tube sheets having reduced heat distortion temperature, tensile strength, Shore hardness, flexibility, or chemical resistance. For example, castor oil-based polyurethanes can exhibit poor chemical resistance. Higher chemical resistance can be achieved by using polybutadiene polyol. However the cost of this polyol is prohibitive. Moreover, both the castor oil- and polybutadiene polyol-based polyurethanes can have lower heat distortion temperatures.

In order to minimize adverse effects on hollow fibers, multi-part polyurethane adhesives should have reduced peak exotherm temperatures. In view of the deficiencies of castor oil- and polybutadiene polyol-based polyurethanes, any reduction in the peak exotherm temperature should not adversely affect heat distortion temperature, tensile strength, Shore hardness, flexibility, or caustic resistance of the tube sheet. Also desirable are the absence of bubbles, reduced discoloration, and low viscosity for facile mixing and casting.

BRIEF DESCRIPTION OF THE INVENTION

A multi-part polyurethane composition that can serve as an adhesive for hollow fibers comprises at least a first part and a second part, wherein the first part comprises a polyurethane prepolymer composition having an NCO content of 15 to 24 wt %, based on the total weight of the polyurethane prepolymer composition; and the second part comprises a polyol having a hydroxyl functionality of 4 to 6, and a desiccant; wherein: the composition comprises 1 to 30 wt % of a plasticizer, based on the total weight of the composition, wherein the plasticizer is present in any one or more of the parts and the composition has a stoichiometry of 1:1 to 1.2:1, wherein stoichiometry is defined as the ratio of equivalents of isocyanate functionality to equivalents of hydroxyl functionality in the composition.

Specifically, the multi-part polyurethane composition comprises a first part and a second part, wherein the first part comprises 70 to 92 wt % of a polyurethane prepolymer composition comprising modified 4,4'-diphenylmethane diisocyanate, having an NCO content of 15 to 24 wt % based on the total weight of the prepolymer composition, and 8 to 30 wt % of a plasticizer comprising an adipate ester, a phthalate ester, a phosphate ester, or a combination thereof, based on the total weight of the first part; the second part comprises 60 to 92 wt % of a polyol having a hydroxyl functionality of 4 to 6; 4 to 30 wt % of a plasticizer comprising an adipate ester, a phthalate ester, a phosphate ester, or a combination thereof, and 0.5 to 10 wt % of a particulate molecular sieve, based on the total weight of the second part; wherein: the polyol having a hydroxyl functionality of 4 to 6 is the only polyol in the composition; and the composition has a stoichiometry of 1:1 to 1.2:1, wherein stoichiometry is defined as the ratio of equivalents of isocyanate functionality in the first part to equivalents of hydroxyl functionality in the second part.

A method of forming a polyurethane comprises mixing a first part and a second part to form a mixed polyurethane composition, wherein: the first part comprises a polyurethane prepolymer composition having an NCO content of 15 to 24 wt %, based on the total weight of the polyurethane prepolymer composition; the second part comprises a polyol having a hydroxyl functionality of 4 to 6, and a desiccant; the composition comprises 1 to 30 wt % of a plasticizer, based on the total weight of the mixed polyurethane composition, the polyol having a hydroxyl functionality of 4 to 6 is the only polyol in the composition; and the composition has a stoichiometry of 1:1 to 1.2:1, wherein stoichiometry is defined as the ratio of equivalents of isocyanate functionality to equivalents of hydroxyl functionality in the composition; and curing the mixed polyurethane composition.

An article comprises a polyurethane made by mixing and curing the multi-part polyurethane composition.

BRIEF DESCRIPTION OF THE DRAWINGS

Referring now to the drawings.

DETAILED DESCRIPTION OF THE INVENTION

Figure 1:
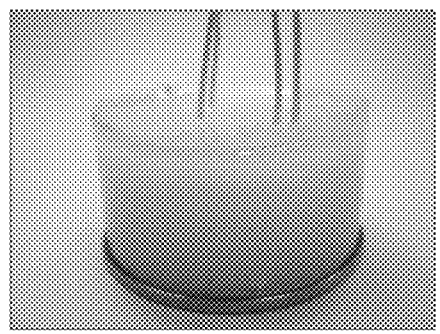
FIG. 1 depicts hollow fibers potted in the polyurethane of Example 1.

The inventors have developed a multi-part polyurethane composition that is an effective adhesive for hollow fibers in filtration modules. The composition employs a polyether tetrol, which affords increased overall crosslink density, resulting in better chemical resistance than castor oil-based polyurethanes. Improved chemical resistance can also be achieved with polybutadiene polyol-based polyurethanes, but these polyurethanes are not cost-effective. Moreover, the polyether tetrol-based polyurethane exhibits a higher heat distortion temperature than both the castor oil-based polyurethanes and polybutadiene polyol-based polyurethanes. Advantageously, the polyether tetrol-based polyurethane composition is free of metal catalysts, which are used in most multi-part polyurethane compositions. The hollow fiber filtration industry is seeking to reduce or eliminate the use of metal-catalyzed multi-part polyurethane compositions. Furthermore, the polyether tetrol-based polyurethane composition has a reduced peak exotherm temperature. Heat distortion temperature, tensile strength, Shore hardness, flexibility, or chemical resistance are not adversely affected by the reduction in peak exotherm temperature. The polyether tetrol-based polyurethane composition also exhibits reduced discoloration, low initial viscosity, and is free of bubbles.

The multi-part polyurethane composition comprises a first part and a second part, wherein the first part comprises a polyurethane prepolymer composition having an NCO content of 15 to 24 wt %, based on the total weight of the polyurethane prepolymer composition; and the second part comprises a polyol having a hydroxyl functionality of 4 to 6, and a desiccant; wherein: the composition comprises 1 to 30 wt %, specifically 4 to 25 wt %, and more specifically 8 to 25 wt % of a plasticizer, based on the total weight of the composition, wherein the plasticizer is present in any one or more of the parts; and the composition has a stoichiometry of 1:1 to 1.2:1, wherein stoichiometry is defined as the ratio of equivalents of isocyanate functionality to equivalents of hydroxyl functionality in the composition. In some embodiments, the multi-part polyurethane composition comprises 4 to 25 wt % of the plasticizer; and the polyol having a hydroxyl functionality of 4 to 6 is the only polyol in the composition.

The multi-part polyurethane composition comprises a first part, which comprises a polyurethane prepolymer composition having an NCO content of 15 to 24 wt %. The first part is sometimes referred to as part (A) in the art. The polyurethane prepolymer composition can comprise monomeric, dimeric, or trimeric isocyanates in addition to the polyurethane prepolymer itself. The polyurethane prepolymer can have an isocyanate functionality of 2 to 6, specifically 2 to 4, isocyanate groups per molecule. For example, the polyurethane prepolymer can be a diisocyanate or a polyisocyanate.

The polyurethane prepolymer composition can be prepared by reacting a polyisocyanate, specifically a diisocyanate, with a polyol, specifically a diol. Useful polyisocyanates include, for example, 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate and cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, 1-isocyanato-1-methyl-4(3)-isocyanatomethyl cyclohexane, alpha,alpha,alpha',alpha'-tetramethyl-1,3-xylylene diisocyanate, alpha,alpha,alpha',alpha'-tetramethyl-1,4-xylylene diisocyanate, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, and a combination thereof. In some embodiments, the polyisocyanate is 4,4'-diphenylmethane diisocyanate. Commercially available 4,4'-diphenylmethane diisocyanate can comprise isomers thereof, for example, 2,4'-diphenylmethane diisocyanate and 2,2'-diphenylmethane diisocyanate.

The polyol used in preparation of the polyurethane prepolymer can be a polyether polyol. The polyether polyol can be the reaction product of an initiator polyol with ethylene oxide, propylene glycol, or a combination thereof. The initiator can be a polyol such as glycerin, trimethylolpropane, 1,2,6-hexanetriol, erythritol, pentaerythritol, mannitol, sorbitol, sucrose, or a combination thereof. In some embodiments, the polyol used to make the polyurethane prepolymer is a polyether diol. Examples of polyether diols include ethylene glycol, diethylene glycol, triethylene glycol, polyethylene glycol, propylene glycol, dipropylene glycol, tripropylene glycol ([(1-methyl-1,2-ethanediyl)bis(oxy)]bis-propanol), polypropylene glycol, polytetramethylene glycol, and a combination thereof.

In some embodiments, the polyurethane prepolymer composition comprises modified 4,4'-diphenylmethane diisocyanate. For example, the polyurethane prepolymer composition can comprise a copolymer of 4,4'-diphenylmethane diisocyanate with tripropylene glycol. Commercial examples of polyurethane prepolymer compositions are MONDUR™ PF, MONDUR™ MRS, and DESMODUR™ E-744, available from Bayer Material Science. In some embodiments, the polyurethane prepolymer composition is MONDUR™ PF, which can comprise 40 to 50 wt % of the polyurethane prepolymer, 50 to 60 wt % of 4,4'-diphenylmethane diisocyanate, and 1 to 10 wt % of 2,4'-diphenylmethane diisocyanate and 2,2'-diphenylmethane diisocyanate, based on the total weight of the MONDUR™ PF, or DESMODUR™ E-744, which can comprise about 50 wt % of the polyurethane prepolymer, about 35 wt % of 4,4'-diphenylmethane diisocyanate, and about 15 wt % of 2,4'- diphenylmethane diisocyanate and 2,2'-diphenylmethane diisocyanate, based on the total weight of the DESMO-DUR™ E-744.

The isocyanate content of the polyisocyanate used in the preparation of the polyurethane prepolymer composition can be 15 to 40 wt %. The isocyanate content of the polyurethane prepolymer composition can be 5 to 24 wt %, specifically 10 to 24 wt %, and more specifically 18 to 24 wt %, based on the total weigh of the polyurethane prepolymer composition. The isocyanate content of the polyurethane prepolymer composition can be, for example 20.3 wt %. The first part of the multi-part polyurethane composition can comprise 80 to 96 wt %, specifically 88 to 92 wt %, of the polyurethane prepolymer composition, based on the total weight of the first part.

The multi-part polyurethane composition comprises a second part, which comprises a polyol having a hydroxyl functionality of 4 to 6. In some embodiments, the polyol has a hydroxyl functionality of 4, and is referred to herein as a "tetrol". The second part comprising a polyol having a hydroxyl functionality of 4 to 6 is sometimes referred to as part (B). In some embodiments, the polyol is a liquid and freely pourable at 20° C., i.e. the polyol is a liquid having a viscosity of 1 to 10,000 centipoise at 20° C. Examples of polyols having a hydroxyl functionality of 4 that are liquid at 20° C. include 1,1,2,2-ethanetetrol and polyether polyols that are the reaction product of an initiator tetrol with ethylene oxide, propylene glycol, or a combination thereof. The initiator can be, for example erythritol, pentaerythritol, 1,1,2,2-tetrol, or a combination thereof. Specific examples of polyether polyols having a functionality of 4 include Polyol 4290, 4360, 4525, 4640, 4800, R4630, R4630, R4631, available from Perstorp and PLURACOL™ PEP 450, PEP 550, and 355, available from BASF.

The polyether tetrol can have a number average molecular weight of 100 to 1000 atomic mass units, specifically 200 to 600 atomic mass units, and more specifically 400 to 500 atomic mass units. The polyether tetrol can be a reaction product of pentaerythritol and propylene oxide, and have a number average molecular weight of 400 to 500 atomic mass units and a hydroxyl number of 435 to 570 milligrams KOH per gram. For example, the polyether tetrol can be the reaction product of pentaerythritol and propylene oxide, and have a hydroxyl number of 435 to 468 milligrams KOH per gram and a number average molecular weight of 500 atomic mass units, and is commercially available as PLURACOL™ PEP-550 from BASF. In some embodiments, the polyether tetrol is the reaction product of 1 mole of pentaerythritol and 4.5 moles of propylene oxide, has a hydroxyl number of 540 to 570 milligrams KOH per gram, a number average molecular weight of 400 atomic mass units, and a Brookfield viscosity at 25° C. of 2500 cP, and is commercially available as PLURACOL™ PEP-450 from BASF.

In some embodiments, tetrols having amine functionality are absent from the multi-part polyurethane composition. The tetrol having amine functionality can be N,N,N',N'-tetrakis(2-hydroxypropyl)ethylenediamine, or the reaction product of N,N,N',N'-tetrakis(2-hydroxypropyl)ethylenediamine with ethylene oxide, propylene oxide, or a combination thereof. For example, N,N,N',N'-tetrakis(2-hydroxypropyl)ethylenediamine, commercially available from BASF Corp. as QUADROL™, is absent from the multi-part polyurethane composition.

The polyether tetrol can be added to the second part of the multi-part polyurethane composition in an amount of 65 to 95 wt %, specifically 80 to 92 wt %, based on the total weight of the second part.

The second part of the multi-part polyurethane composition also comprises a desiccant. The desiccant is any hygroscopic substance which is capable of adsorbing moisture, provided that substance has limited or no reactivity with the polyurethane prepolymer composition. The inventors have determined that a desiccant advantageously reduces outgassing in the presence of moisture, which improves the appearance of the polyurethane by reduction in the number of bubbles. Without being bound by theory, in hollow fiber applications, the desiccant is believed to react with moisture in the hollow fibers, thereby avoiding the reaction of the moisture with the polyurethane prepolymer composition and the resulting release of carbon dioxide.

In some embodiments, the desiccant is an inorganic substance, for example activated alumina, silica gel, aluminosilica gel, zeolites, activated bentonite, metal oxides, molecular sieves, activated carbon, or a combination thereof. The adsorbent can be in the form of a powder, mesh, cylindrical pellets, beads, or spheres. In some embodiments, the desiccant comprises particulate molecular sieves. Molecular sieves have the general chemical formula $M_x[(AlO_2)_x(SiO_2)_y].z\,H_2O$ in powder form, for example 3A and 5A molecular sieves, in which M is Ca and Na. 3A and 5A molecular sieves are available from UOP as 3A MOL-SIV™ and 5A MOLSIV™ Adsorbents, respectively. In some embodiments, the desiccant is 5A molecular sieves. The desiccant can be added to the second part of the multi-part polyurethane composition in an amount of 0.5 to 10 wt %, specifically 0.5 to 6.0 wt %, based on the total weight of the second part.

The multi-part polyurethane composition comprises 4 to 25 wt % of a plasticizer, based on the total weight of the composition, wherein the plasticizer is present in any one or more of the parts. Useful plasticizers include, for example, esters of organic acids such as dicarboxylates, tricarboxylates, azelates, sebacates, maleates, fumarates, succinates, phthalates, adipates, trimellitates, glutarates, citrates, benzoates, dibenzoates, epoxidized soybean oil, esters of soybean oil, phosphate esters, and a combination thereof.

Dicarboxylate diesters include phthalate esters. Examples of useful phthalate esters include bis(2-ethylhexyl)phthalate, diisononyl phthalate, di-n-butyl phthalate, butyl benzyl phthalate, diisodecyl phthalate, di-n-octyl phthalate, diisooctyl phthalate, diethyl phthalate, diisobutyl phthalate, dioctyl phthalate, diundecyl phthalate, di-n-hexyl phthalate, di($C_{6-12}$-linear/branched alkyl)phthalate, and a combination thereof.

Dicarboxylate esters also include aliphatic diesters, such as adipates, glutarates, sebacates, maleates, fumarates, or a combination thereof. Examples of aliphatic diesters include polyester glutarate, dibutoxyethyl adipate, dibutoxyethoxyethyl adipate, bis(2-ethylhexyl) adipate, dioctyl adipate, polyester adipate, dimethyl adipate, monomethyl adipate, diisodecyl adipate, diisononyl adipate, bis(2-ethylhexyl)sebacate, bis(2-ethylhexyl)azelate, di($C_{7-9}$-linear and branched alkyl)adipate, butyl fumarate, diisobutyl fumarate, bis(2-ethylhexyl)fumarate, diethyl maleate, dimethyl maleate, diheptyl adipate, dioctyl adipate, dinonyl adipate, dibutyl sebacate, dibutyl maleate, diisobutyl maleate, triethylene glycol dihexanoate, tetraethylene glycol diheptanoate, diisononyl 1,2-cyclohexanedicarboxylate, and a combination thereof.

Useful tricarboxylate esters include trimellitate esters and citrate esters. Specific examples of useful trimellitate esters include trimethyl trimellitate, tri(2-ethylhexyl) trimellitate, tri(n-octyl, n-decyl)trimellitate, tri($C_{7-9}$-alkyl)trimellitate, n-octyl trimellitate, and a combination thereof. Specific examples of useful citrates include tri-n-butyl citrate, triethyl citrate, trimethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, and a combination thereof.

Examples of useful esters of soybean oil include methyl soyate, ethyl soyate, propyl soyate, and a combination thereof.

Examples of useful phosphates include o-isopropylphenyl diphenyl phosphate, triethyl phosphate, tributyl phosphate, trioctyl phosphate, tributoxyethyl phosphate, butylphenyl diphenyl phosphate, cresyl diphenyl phosphate, triphenyl phosphate, tricresyl phosphate, triisopropyl phenyl phosphate, 2-ethylhexyl phosphate, isodecyl diphenyl phosphate, trixylenyl phosphate, diphenyl octyl phosphate, and a combination thereof.

Other examples of useful plasticizers include dipropylene glycol dibenzoate, diethylene glycol dibenzoate, dioctyl terephthalate, epoxidized vegetable oils, alkyl sulphonic acid phenyl ester, N-ethyl toluene sulfonamide (ortho and para isomers), N-(2-hydroxypropyl) benzene sulfonamide, N-(n-butyl)benzene sulfonamide, acetylated monoglycerides, glycol esters, polyether esters, polybutene and other polymeric plasticizers, and a combination thereof.

Commercial sources of plasticizers include: Velsicol Chemical, for BENZOFLEX™ plasticizers, for example dipropylene glycol dibenzoate (BENZOFLEX™ 9-88), a mixture of dipropylene glycol dibenzoate and diethylene glycol dibenzoate (BENZOFLEX™ 50), and polypropylene glycol dibenzoate (BENZOFLEX™ 400); Exxon Mobil Chemical, for JAYFLEX™ plasticizers, for example di($C_{6-12}$-linear/branched alkyl) phthalate (JAYFLEX™ L771P), diisodecyl phthalate (JAYFLEX™ DIDP), and dioctyl phthalate (DOP); Monsanto, for DIOCTYL™, SANTICIZER™, and DIBUTYL™ plasticizers; Bayer, for ADIMOLL™, DISFLAMOLL™, MESAMOLL™, UNIMOLL™, TEGDA™, TRIACETIN™ and ULTRAMOLL™ plasticizers; and Dow Chemicals, for epoxidized soybean oil (FLEXOL™ plasticizer).

In some embodiments, the plasticizer comprises an adipate ester, a phthalate ester, a phosphate ester, or a combination thereof. For example, the plasticizer can comprise dioctyl adipate, di($C_{6-12}$-linear/branched alkyl)phthalate, ditridecyl phthalate, diisononyl phthalate, diisoundecyl phthalate, cresyl phosphate, or a combination thereof.

Since the multiple-part polyurethane composition comprises a polyurethane prepolymer composition having isocyanate groups, it is desirable that the plasticizer has a low water content. Any water present could react with the polyurethane prepolymer composition, forming carbon dioxide, which could result in bubbles in the polyurethane composition. Therefore it is desirable that the plasticizer has a maximum water content of less than or equal to 0.04 wt %. It is also desirable that the plasticizer does not have any active hydrogen atoms, for example hydroxyl, primary amino, and secondary amino groups, since these can also react with the polyurethane prepolymer composition having isocyanate groups.

The multi-part polyurethane composition comprises 1 to 30 wt %, specifically 4 to 25 wt %, and more specifically 5 to 10 wt %, of the plasticizer, based on the total weight of the multi-part polyurethane composition. The plasticizer can be added to the first or second part or both. For example, the plasticizer can be added to the second part, and then the second part containing the plasticizer can be mixed with the first part. The plasticizer can also be added to the first part, and then the first part containing the plasticizer can be mixed with the second part. In some embodiments, the plasticizer is added to both the first and second parts, which are then mixed together to form a polyurethane mixture. When the plasticizer is distributed between the first part and second part, the first part can comprise 8 to 30 wt %, specifically 8 to 12 wt % of plasticizer, based on the total weight of the first part, and the second part can comprise 4 to 30 wt %, or 3 to 10 wt %, specifically 4 to 9 wt %, of the plasticizer, based on the total weight of the second part. The plasticizer can be utilized as a diluent to adjust the isocyanate content of the first part and/or the polyol hydroxyl content of the second part to the desired stoichiometry at the desired mix ratio, and/or to adjust the viscosity of the first and/or second parts. In some embodiments, the plasticizer has an initial boiling point of more than 200 degrees centigrade.

The multi-part polyurethane composition has a stoichiometry of 1:1 to 1.2:1, wherein stoichiometry is defined as the ratio of equivalents of isocyanate functionality to equivalents of hydroxyl functionality in the composition. Multi-part polyurethane compositions used to prepare polyurethanes can be characterized by "stoichiometry", which is calculated according to the equation:

$$\text{Stoichiometry} = \frac{Moles_{NCO}}{Moles_{OH} + Moles_{HOH} + Moles_{NH}}$$

wherein "$Moles_{NCO}$" is the total moles of isocyanate groups in the multi-part polyurethane composition, "$Moles_{OH}$" is the total moles of OH groups in the multi-part polyurethane composition from sources other than water (including OH groups from alcohols and carboxylic acids), "$Moles_{HOH}$" is the total moles of OH groups in the multi-part polyurethane composition from any water present, which is twice the moles of water, and "$Moles_{NH}$" is the moles of any NH groups in the reaction mixture. Stoichiometry is related to "isocyanate index", often used in the art, which is equivalent to the stoichiometry times 100. When the multi-part polyurethane composition molar ratio of isocyanate groups to hydroxyl groups is 1:1 and no water or NH groups are present in the polyurethane mixture, the stoichiometry is 1:1, and the isocyanate index is 100. The multi-part polyurethane composition can have a stoichiometry of 1:1 to 1.2:1, and more specifically 1:1 to 1.1:1.

Advantageously, the multi-part polyurethane composition does not need a polyurethane catalyst to cure. Thus in some embodiments, polyurethane catalysts are absent from the composition. However, the cure rate can be accelerated with a polyurethane catalyst. Polyurethane catalysts include metal catalysts. Examples of metal catalysts include stannous octoate, available as DABCO™ T-9; butyldiisoctyl tin thioacetate, available as DABCO™ T-131; dibutyltin dilaurate, available as DABCO™ T-12; and dibutyltin diacetate, available as METACURE™ T-1, all available from Air Products; a blend of zinc neodecanoate, bismuth neodecanoate and neodecanoic acid, available as BICAT™ 8 from Shepherd Chemical; ferric acetylacetonate, available as AMSPEC™ GCR-56 from Amspec Chemical; dimethyltin dineodecanoate, available as FOMREZ™ UL-28; and a combination thereof.

Advantageously, a catalyst for the present multi-part polyurethane composition does not need to be a metal catalyst. Metal catalysts can be undesirable due to the possibility of leeching of the metal ions from the polyurethane in the end-use application. Thus, in some embodiments, a metal catalyst is absent from the composition.

Advantageously, curing of the multi-part polyurethane composition can be accelerated with an amine catalyst instead of a metal catalyst. The amine catalyst can comprise 1,4-diazabicyclooctane, available as DABCO™ Crystalline Catalyst or N-cetyl-N,N,-dimethylamine, available as DABCO™ B-16, or a combination thereof. When present, the amine catalyst can be added to the second part of the multi-part polyurethane composition. Thus in some embodiments, the multi-part polyurethane composition further comprises 0.01 to 0.5 wt % of an amine catalyst, based on the weight of the second part of the multi-part polyurethane composition.

The cured polyurethane composition, which comprises a polyol having a hydroxyl functionality of 4 to 6, has excellent physical properties, properties that could not be obtained with other polyols. For example, the cured polyurethane composition has a reduced peak exotherm temperature. Moreover, solvents, including volatile solvents which would increase the volatile organic content (VOC) of the multi-part polyurethane composition, are not added. Thus in some embodiments, solvents, for example hydrocarbons such as branched, linear, cyclic paraffinic and naphthenic hydrocarbons; aromatic hydrocarbons such as benzene, toluene and xylene; low boiling mono-, di-, and tri-, hydric alcohols such as methanol, ethanol, propanols, butanols, pentanols, glycol, glycerol, and ethers thereof; and low boiling ethers such as dialkyl or cyclic ethers; and a combination thereof, are all absent from the composition. In some embodiments, volatile solvents with an initial boiling point of less than or equal to 300 degrees, specifically less than or equal to 200 degrees centigrade, and more specifically 30 to 200 degrees centigrade, are absent from the multi-part polyurethane composition. In some embodiments, volatile organic solvents having an initial boiling point of less than or equal to 200° C., polyester polyols, castor oil, castor oil derivatives, esters of ricinoleic acid, other polyols derived from natural oils, other polyols derived from fats, polylactones, polybutadiene and polyisobutylene polyols, polyols having amine functionality are all absent from the composition.

The multi-part polyurethane composition can further comprise an additive intended to modify properties of the multi-part polyurethane composition and the polyurethane resulting from mixing and curing the multi-part polyurethane. The additive can be any additive that is known in the art, provided it does not react with the polyurethane prepolymer composition, i.e. it has no reactive hydrogen atoms. The additive can comprise a defoamer, a flow and leveling agent, a UV stabilizer, an antioxidant, a mold release agent, a dispersing agent, a wetting agent, a pigment, a dye, a filler, or a combination thereof. In some embodiments, the multi-part polyurethane composition comprises a defoamer, and/or a flow and leveling agent, and/or a UV stabilizer, and/or an antioxidant. The multi-part polyurethane composition can comprise 0.005 to 10 wt %, specifically 0.01 to 5 wt %, more specifically 0.01 to 1 wt %, and still more specifically 0.01 to 0.1 wt % total additive, based on the total weight of the composition, wherein the additive is present in any one or more of the parts.

In some embodiments, the additive comprises a defoamer, which is intended to reduce bubbles generated during mixing that could become entrained in the cured polyurethane. The defoamer can be any defoamer known in the art, provided it does not react with the polyurethane prepolymer composition, i.e. it has no reactive hydrogen atoms. The defoamer can be a silicone-based defoamer, for example, an alkyl aryl siloxane polymer, such as methylhexylisopropylbenzyl siloxane, which is available as SF8843 from Momentive Performance Materials Holdings. The defoamer can also be silicone-free, for example it can be an isoparaffin, such as BYK™ 054, which is available from BYK USA. When present, the first or second parts of the multi-part polyurethane composition can each comprise 0.01 to 0.1 wt % of the defoamer, based on the total weight of the first or second part. In another embodiment, the first and second parts of the multi-part polyurethane composition can each comprise 0.005 to 0.05 wt % of the defoamer.

Many specific embodiments of the multi-part polyurethane composition described generically above will be apparent to the skilled person in the art. For example, in some embodiments, the multi-part polyurethane composition comprises a first part and a second part, wherein the first part comprises 70 to 92 wt %, specifically 88 to 92 wt %, of a polyurethane prepolymer composition comprising modified 4,4'-diphenylmethane diisocyanate, having an NCO content of 15 to 24 wt % based on the total weight of the prepolymer composition, and 8 to 30 wt %, specifically 8 to 12 wt %, of a plasticizer comprising an adipate ester, a phthalate ester, a phosphate ester, or a combination thereof, based on the total weight of the first part; the second part comprises 60 to 92 wt %, specifically 80 to 92 wt % of a polyol having a hydroxyl functionality of 4 to 6, specifically a propoxylated pentaerythritol having a hydroxyl functionality of 4; 4 to 30 wt %, specifically 4 to 9 wt %, of a plasticizer comprising an adipate ester, a phthalate ester, a phosphate ester, or a combination thereof, and 0.5 to 10 wt % of a particulate molecular sieve, based on the total weight of the second part; wherein: the propoxylated pentaerythritol is the only polyol in the composition; and the composition has a stoichiometry of 1:1 to 1.2:1, wherein stoichiometry is defined as the ratio of equivalents of isocyanate functionality in the first part to equivalents of hydroxyl functionality in the second part. In some embodiments, the first part comprises 88 to 92 wt % of the polyurethane prepolymer composition and 8 to 12 wt % of the plasticizer; and the second part comprises 80 to 92 wt % of a propoxylated pentaerythritol having a hydroxyl functionality of 4, and 4 to 9 wt % of the plasticizer. In some embodiments, a propoxylated pentaerythritol is the only polyol in the composition.

A method of forming a polyurethane comprises mixing the first part and second part of the multi-part polyurethane composition in a 100:25 to 25:100 weight ratio, specifically a 100:33 to 33:100 weight ratio, to form a polyurethane mixture, and curing the polyurethane mixture to form the polyurethane. The multi-part polyurethane composition can be combined and mixed by hand mixing, static mixing, dynamic mixing, or other methods. Many end users have mixing equipment that is set up to mix the first part and second part of two-part polyurethane compositions in a fixed volume ratio of 100:50. Thus, in some embodiments, a polyurethane can be made by mixing the first part and second part in a 110:40 to 90:60 volume ratio, specifically a 105:45 to 95:55 volume ratio, and more specifically a 100:50 volume ratio, of the first and second parts, respectively, to form a polyurethane mixture, and curing the polyurethane mixture to form the polyurethane. In some embodiments, the first part and second part are mixed in a 90:110 to 110:90 volume ratio, specifically a 95:105 to 105:95 volume ratio, and more specifically, a 100:100 volume ratio, respectively, to form a polyurethane mixture, and curing the polyurethane mixture to form the polyurethane. In some embodiments, a polyurethane is made by mixing the first part and the second part in a 110:40 to 90:60 volume ratio of the first and second parts, respectively, or a 90:110 to 110:90 volume ratio of the first and second parts respectively, to form a polyurethane mixture, and curing the polyurethane mixture. The concentrations of isocyanate in the first part and hydroxyl in the second part can be adjusted so that the desired stoichiometry between them is achieved at the desired mixing ratio. In some embodiments, weight ratios are used. Thus, the above numerical ratios can also be weight ratios.

Any of the variations in the multi-part polyurethane composition described above are also applicable to the method of forming the polyurethane. Thus in some embodiments, a method of forming the polyurethane comprises mixing a first part and a second part to form a mixed polyurethane composition, wherein: the first part comprises a polyurethane prepolymer composition having an NCO content of 15 to 24 wt %, based on the total weight of the polyurethane prepolymer composition; the second part comprises a polyol having a hydroxyl functionality of 4 to 6, specifically a polyether polyol having a hydroxyl functionality of 4, and a desiccant; the composition comprises 1 to 30 wt %, specifically 4 to 25 wt %, and more specifically 8 to 25 wt % of a plasticizer, based on the total weight of the mixed polyurethane composition; the polyol having a hydroxyl functionality of 4 to 6 is the only polyol in the composition; and the composition has a stoichiometry of 1:1 to 1.2:1, wherein stoichiometry is defined as the ratio of equivalents of isocyanate functionality to equivalents of hydroxyl functionality in the composition; and curing the mixed polyurethane composition. In some embodiments of the method, the composition comprises 8 to 25 wt % of the plasticizer.

In some embodiments, all or a portion of the plasticizer can form a third part of the multi-part polyurethane composition. In this embodiment, the first and second parts can each be added to the third part, or the third part can be added to the first and second parts, which are then mixed. Alternatively, the first, second, and third parts can be simultaneously added to an empty vessel and mixed therein.

Immediately after mixing, the multi-part polyurethane composition should have a maximum initial mix viscosity of 1,500 cP. The term "initial mix viscosity" refers to the viscosity of the multi-part polyurethane composition immediately after mixing the first, second, and any other parts present. In some embodiments, the initial mix viscosity of the multi-part polyurethane composition is 100, 200, 300, or 400 to 1,500 cP, specifically 500 to 1,200 cP.

After mixing the parts of the multi-part polyurethane composition, it can be cured at 0 to 250° C. for 1 to 168 hours to form the polyurethane. The curing can be done under conditions employed by end-users for epoxy-amine and other two-part polyurethane adhesives. For example, the curing can be done in two stages, with the initial curing at room temperature and the final curing at elevated temperatures. For example, the multi-part polyurethane composition can be cured first at 25° C. for 24 hours, then at 65° C. for 16 hours or at 80° C. for 4 hours.

When the polyurethane is fully cured, it can have certain physical properties that are beneficial for hollow fiber applications. The polyurethane can have a Shore hardness of 70D to 90D, specifically 75D to 80D, and more specifically 85D to 90D, measured in accordance with ASTM D2240-05. When the polyurethane is fully cured, it can have a tensile strength of 100 to 10,000 psi, specifically 1,500 to 10,000 psi, more specifically 2,000 to 8,000 psi, and still more specifically 3,000 to 7,000 psi, as measured in accordance with ASTM D412-06A, for example using an Instron Tensiometer.

With the viscosity adjusted as needed, the multi-part polyurethane composition could be employed as an adhesive to construct a wide variety of rigid and flexible articles. For example, it can be used to bond plastics, metals, glass, textiles, paper, cardboard, and wood. Thus, in some embodiments, an article comprises the polyurethane made by mixing and curing the multi-part polyurethane composition. All of the variations in the multi-part polyurethane composition and polyurethane described above also apply to an article comprising the polyurethane. In particular, the polyurethane obtained by mixing and curing the multi-part polyurethane composition can function as an adhesive in a separatory device. The separatory device can be a filtration module comprising membranes which are used to separate of a wide variety of gaseous and aqueous streams, for example air, sea water, waste water, and biological fluids, such as blood. The membranes used to accomplish these separations can be fabricated in various geometries, such as a flat sheet, spiral wound sheet, tubular, and hollow fiber. Thus, in some embodiments, the article comprises a filtration module comprising membranes or hollow fibers, in which the polyurethane is in contact with the membranes or hollow fibers.

Separatory devices comprising hollow fibers are useful for dialysis, ultra-filtration, reverse osmosis, hemodialysis, and other applications. The device has a plurality of fine, hollow fibers whose end portions are potted in a tube sheet and whose open fiber ends terminate in a tube sheet face which provides liquid access to the interior of the fibers. The tube sheet comprises the polyurethane obtained by mixing and curing the multi-part polyurethane composition. Thus in some embodiments, the article comprises hollow fibers potted in the polyurethane obtained by mixing and curing the multi-part polyurethane composition.

The invention includes at least the following embodiments.

Embodiment 1. A multi-part polyurethane composition comprising at least a first part and a second part, wherein the first part comprises a polyurethane prepolymer composition having an NCO content of 15 to 24 wt %, based on the total weight of the polyurethane prepolymer composition; and the second part comprises a polyol having a hydroxyl functionality of 4 to 6, and a desiccant; wherein: the composition comprises 1 to 30 wt % of a plasticizer, based on the total weight of the composition, wherein the plasticizer is present in any one or more of the parts; and the composition has a stoichiometry of 1:1 to 1.2:1, wherein stoichiometry is defined as the ratio of equivalents of isocyanate functionality to equivalents of hydroxyl functionality in the composition.

Embodiment 2. The multi-part polyurethane composition of embodiment 1, wherein the polyol having a hydroxyl functionality of 4 to 6 is a liquid having a viscosity of 1 to 10,000 centipoise at 20° C.

Embodiment 3. The multi-part polyurethane composition of embodiment 1 or 2, wherein the polyol having a hydroxyl functionality of 4 to 6 is a polyether polyol having a hydroxyl functionality of 4.

Embodiment 4. The multi-part polyurethane composition of any of embodiments 1-3, wherein the multi-part polyurethane composition comprises 4 to 25 wt % of the plasticizer; and the polyol having a hydroxyl functionality of 4 to 6 is the only polyol in the composition.

Embodiment 5. The multi-part polyurethane composition of any of embodiments 1-4, wherein volatile organic solvents having an initial boiling point of less than or equal to 200° C., polyester polyols, castor oil, castor oil derivatives, esters of ricinoleic acid, other polyols derived from natural oils, other polyols derived from fats, polylactones, polybutylene and polyisobutylene polyols, and polyols having amine functionality are all absent from the composition.

Embodiment 6. The multi-part polyurethane composition of any of embodiments 1-5, wherein polyurethane catalysts are absent from the composition.

Embodiment 7. The multi-part polyurethane composition of any of embodiments 1-5, further comprising 0.01 to 0.5 wt % of an amine catalyst, based on the weight of the second part.

Embodiment 8. The multi-part polyurethane composition of any of embodiments 1-7, wherein the polyurethane prepolymer composition comprises modified 4,4'-diphenylmethane diisocyanate.

Embodiment 9. The multi-part polyurethane composition of any of embodiments 1-8, wherein the plasticizer comprises an adipate ester, a phthalate ester, a phosphate ester, or a combination thereof.

Embodiment 10. The multi-part polyurethane composition of any of embodiments 1-9, wherein the desiccant comprises particulate molecular sieves.

Embodiment 11. The multi-part polyurethane composition of any of embodiments 1-10, wherein the composition further comprises an additive comprising a defoamer, a flow and leveling agent, a UV stabilizer, an antioxidant, a mold release agent, a thixotropic agent, a dispersing agent, a wetting agent, a pigment, a dye, a filler, or a combination thereof.

Embodiment 12. The multi-part polyurethane composition of embodiment 1, wherein: the polyurethane prepolymer composition comprises modified 4,4'-diphenylmethane diisocyanate, having an NCO content of 15 to 24 wt % based on the total weight of the polyurethane prepolymer composition, and the plasticizer comprises an adipate ester, a phthalate ester, a phosphate ester, or a combination thereof; and the first part comprises, based on the total weight of the first part, 70 to 92 wt % of the polyurethane prepolymer composition and 8 to 30 wt % of the plasticizer; and the second part comprises, based on the total weight of the second part, 60 to 92 wt % of the polyol having a hydroxyl functionality of 4 to 6, and 0.5 to 10 wt % of the desiccant, wherein the desiccant is a particulate molecular sieve.

Embodiment 12a. A multi-part polyurethane composition comprising a first part and a second part, wherein the first part comprises 70 to 92 wt % of a polyurethane prepolymer composition comprising modified 4,4'-diphenylmethane diisocyanate, having an NCO content of 15 to 24 wt % based on the total weight of the polyurethane prepolymer composition, and 8 to 30 wt % of a plasticizer comprising an adipate ester, a phthalate ester, a phosphate ester, or a combination thereof, based on the total weight of the first part; the second part comprises 60 to 92 wt % of a polyol having a hydroxyl functionality of 4 to 6; 4 to 30 wt % of a plasticizer comprising an adipate ester, a phthalate ester, a phosphate ester, or a combination thereof, and 0.5 to 10 wt % of a particulate molecular sieve, based on the total weight of the second part; wherein: the polyol having a hydroxyl functionality of 4 to 6 is the only polyol in the composition; and the composition has a stoichiometry of 1:1 to 1.2:1, wherein stoichiometry is defined as the ratio of equivalents of isocyanate functionality in the first part to equivalents of hydroxyl functionality in the second part.

Embodiment 13. The multi-part polyurethane composition of embodiment 12 or 12a, wherein the first part comprises 88 to 92 wt % of the polyurethane prepolymer composition and 8 to 12 wt % of the plasticizer; and the second part comprises 80 to 92 wt % of a propoxylated pentaerythritol having a hydroxyl functionality of 4, and 4 to 9 wt % of the plasticizer.

Embodiment 14. A polyurethane made by mixing the first part and second part of embodiment 1 in a 110:40 to 90:60 volume ratio of the first and second parts, respectively, or a 90:110 to 110:90 volume ratio of the first and second parts, respectively, to form a polyurethane mixture, and curing the polyurethane mixture.

Embodiment 15. An article comprising a polyurethane made by mixing and curing the multi-part polyurethane composition of any of embodiments 1-13.

Embodiment 16. The article of embodiment 15, wherein the polyurethane functions as an adhesive in a separatory device.

Embodiment 17. The article of embodiment 16, wherein the article comprises a filtration module comprising membranes or hollow fibers, in which the polyurethane is in contact with the membranes or hollow fibers.

Embodiment 18. The article of embodiment 17, comprising hollow fibers potted in the polyurethane.

Embodiment 19. A method of forming a polyurethane comprising mixing a first part and a second part to form a mixed polyurethane composition, wherein: the first part comprises a polyurethane prepolymer composition having an NCO content of 15 to 24 wt %, based on the total weight of the polyurethane prepolymer composition; the second part comprises a polyol having a hydroxyl functionality of 4 to 6, and a desiccant; the composition comprises 1 to 30 wt % of a plasticizer, based on the total weight of the mixed polyurethane composition; the polyol having a hydroxyl functionality of 4 to 6 is the only polyol in the composition; and the composition has a stoichiometry of 1:1 to 1.2:1, wherein stoichiometry is defined as the ratio of equivalents of isocyanate functionality to equivalents of hydroxyl functionality in the composition; and curing the mixed polyurethane composition.

Embodiment 20. The method of embodiment 19, wherein the composition comprises 8 to 25 wt % of the plasticizer.

EXAMPLES

The materials utilized in these examples are described below in Table 1.

TABLE 1

MATERIALS

| Component | Description and Supplier |
|---|---|
| MDI PF | Prepolymer composition from 4,4'-diphenylmethane diisocyanate containing 50-60 wt % 4,4'-diphenylmethane diisocyanate, 40-50 wt % prepolymer (dipropylene glycol, polymer with 4,4'-diphenylmethane diisocyanate), and 1-10 wt % diphenylmethane diisocyanate mixed isomers; CAS Reg. No. 52747-01-0; available as MONDUR ™ PF from Bayer Material Science; and having an NCO content of 22.6-23.1 wt %. |

TABLE 1-continued

MATERIALS

| Component | Description and Supplier |
|---|---|
| MDI E-744 | Prepolymer composition from 4,4'-diphenylmethane diisocyanate containing 50 wt % polyurethane prepolymer, 35 wt % 4,4'-diphenylmethane diisocyanate, and 15 wt % diphenylmethane diisocyanate isomers; available as DESMODUR ™ E -744 from Bayer Material Science; and having an NCO content of 23.0-24.0 wt %; a percent solids of 100%; and a viscosity of 300-900 cP at 25° C. |
| PEP 450 | Reaction product of 1 mole of pentaerythritol and 4.5 moles of propylene oxide, having a hydroxyl number of 560 a number average molecular weight of 400, and a Brookfield viscosity of 2500 cP at 25° C., available from BASF as PLURACOL ™ PEP-450. |
| CO | Caster Oil. |
| POLY-G | Ethylene oxide-propylene oxide copolymer ether with glycerol; C.A.S. Reg. No. 9082-00-2, available from Monument Chemical as POLY-G ™ 76-635; and having a number average molecular weight of 265 g/mol, a hydroxyl no. of 648 mg KOH/g, and an acid no. of 0.05 mg KOH/g. |
| DOA | Dioctyl adipate, a plasticizer available from Parchem Fine and Speciality Suppliers. |
| 5A | 5A Molecular sieves, an alkali aluminosilicate, calcium form, of Type A crystal structure, available from UOP LLC as 5A MOLSIV ™ Adsorbent. |
| DABCO | 1,4-Diazabicyclo[2.2.2]octane, C.A.S. Reg. No. 112-69-6, an amine catalyst available in powder form as DABCO ™ B-16 from Air Products. |
| UL-28 | Dimethyltin dineodecanoate, available as FOMREZ ™ UL-28 from Momentive Performance Materials. |
| SF 8843 | Methylhexylisopropylbenzyl siloxane defoamer, available as SF 8843 from Momentive Performance Materials. |
| MFP | Medium molecular weight, acrylic-based flow and leveling agent, available as MODAREZ ™ MFP from Synthron. |
| UV-5411 | 2-(2-Hydroxy-5-tert-octylphenyl)benzotriazole, a UV light absorber, available as CYASORB ™ UV-5411 from Cytec Industries. |

Test methods employed to evaluate the multi-part polyurethane composition and polyurethane are summarized in Table 2.

TABLE 2

TEST METHODS

| | |
|---|---|
| Isocyanate Content | ASTM D2572-97(2010) |
| Viscosity Prepolymer, 25° C. | ASTM D2393-86 |
| Viscosity Curative, 25° C. | ASTM D2393-86 |
| Initial Mixed Viscosity, 25° C. | ASTM D2393-86 |
| Worklife, 25° C. | ASTM D2393-86 |
| Shore Hardness | ASTM D2240-05 |
| Tensile Strength | ASTM D412-06A |
| Elongation | ASTM D412-06A |
| Tear Strength | ASTM D624-00 |
| Linear Shrinkage, 80° C. | ASTM D2566-86 |
| Gel Time and Peak Exotherm Temperature | ASTM D2471-99 |

Measurement of exotherms was conducted in accordance with ASTM D2471-99 Standard Test Method for Gel Time and Peak Exothermic Temperature of Reacting Thermosetting Resins. A mold that was 8 inches in diameter and 2.45 inches in height, and a sample size of 2,000 grams, were used. The exotherm was measured in ° C. per unit mass in kg. Parts (A) and part (B) were mixed together (2,000 grams total) and degassed for 5 minutes. The degassed mixed was poured inside the mold and a thermocouple was placed in the middle of the sample. The temperature was recorded unit it reached a maximum value and began to decrease.

Parts (A) and (B) of the two-part polyurethane compositions were prepared according to the following procedures. Component amounts are provided in Table 3.

Preparative Example 1

Preparation of Part (A)

A general procedure is provided. Polyurethane prepolymer composition was charged into a reaction vessel equipped for agitation, vacuum, heating and cooling. SF 8843 and dioctyl adipate were also added to the vessel. The reaction vessel was then sealed under a vacuum of at least about 27 in. Hg and stirred for 1 hr. at room temperature to form part (A). A sample of part (A) was analyzed to determine NCO content according to ASTM D2572-97 (2010). The target NCO value of 20.30 weight percent was obtained in Example 1.

Preparative Example 2

Preparation of Part (B)

Part (B) was prepared by mixing polyether polyol, plasticizer, and defoamer in a vessel for 30 min. Water was then stripped from the mixture until the water content was less than 0.04%. Desiccant, catalyst, when present, and other additives such as UV absorber, when present, were then added. The resulting mixture, Part (B), was stirred for 40 to 45 min, or until homogenous.

Examples 1-2 and Comparative Example 1

Preparation of Polyurethanes

The polyurethanes of Examples 1 and 2, and Comparative Example 1 were prepared by mixing corresponding parts (A) and (B) in a ratio of 200:104, 200:100, and 61.7:100 by weight, respectively, to form polyurethane mixtures. The polyurethane mixtures were cured at 25° C. for 24 hours, and then at 65° C. for 16 hours. Test results for the cured polyurethanes are summarized in Table 3.

TABLE 3

POLYURETHANE COMPOSITIONS AND PHYSICAL PROPERTIES

| Component | Type | Relative Amount (wt %) | | |
|---|---|---|---|---|
| | | Example 1 | Example 2 | Comp. Ex. 1 |
| Part (A) | | | | |
| MDI PF | Polyisocyanate | 90.24 | 90.24 | — |
| MDI E-544 | Polyisocyanate | — | — | 100 |
| DOA | Plasticizer | 9.7 | 9.7 | — |
| MFP | Flow and leveling agent | 0.06 | 0.06 | — |
| Total Part (A) (wt %) | | 100 | 100 | — |
| Part (B) | | | | |
| PEP 450 | Tetrol | 88.64 | 88.64 | — |
| CO | Triol | — | — | 96.51 |
| POLY-G | Triol | — | — | 3.46 |
| 5A | Desiccant | 4.76 | 4.76 | — |
| DOA | Plasticizer | 6.52 | 6.32 | — |
| SF884 | Defoamer | 0.03 | 0.03 | 0.02 |
| UV-5411 | UV stabilizer | 0.05 | 0.05 | — |
| DABCO | Amine catalyst | — | 0.02 | — |
| UL-28 | Tin catalyst | — | — | 0.01 |
| Total Part (B) (wt %) | | 100 | 100 | — |
| Mix Ratio (A:B by weight) | | 193:100 | 200:100 | 61.7:100 |
| Plasticizer in A + B (wt. %) | | 5.53 | 5.34 | — |

| Physical Properties | Units | Values | | |
|---|---|---|---|---|
| Viscosity of (A), 25° C. | cP | 500 | 500 | 1,280 |
| Viscosity of (B), 25° C. | cP | 2,500 | 2,000 | 970 |
| Initial mix visc., 25° C. | cP | 1,200 | 1,200 | 1,150 |
| Work life, 25° C. | min. | 75 | 25 | 15 |
| Shore Hardness | | 85D | 85D | 50D |
| Tensile strength | psi | 6,200 | 6,100 | 4,013 |
| Exotherm | ° C./kg | 131/1.6 = 81.91 | 145/9.0 = 16.1 | — |
| Linear Shrinkage, 80° C. | % | 0.00 | 0.00 | 0.01 |
| NaOH Resistance, 2% NaOH at 72° C. after 1,000 hrs. | % weight gain/loss | 40 (loss) | 1.7 (gain) | 50 (loss) |
| Heat Distortion Temp. | ° C. | 98 | 98 | 58 |

As can be seen from Table 3, Examples 1 and 2 exhibit several advantageous properties relative to Comparative Example 1. They exhibit a Shore hardness of at least 85D, a tensile strength of at least 6,100 psi, and a heat distortion temperature of at least 98° C., compared to 4,013 psi, 50D, and 58° C., respectively, for Comparative Example 1.

Example 3

Comparison of Example 1 to Epoxy Potting Compound

The performance of the polyurethane composition of Example 1 was compared to that of a standard amine-cured bisphenol A-type epoxy potting compound (Comparative Example 2) in the static potting of a bundle of hollow fibers on a lab scale. When used for potting hollow fibers, the polyurethane composition of the present invention can be referred to as a "potting adhesive" in the alternative. A brief description of the steps used in the lab scale evaluation of the polyurethane composition as a potting adhesive is as follows:

1. A bundle of dry fibers with a water content of less than 6 wt % and a diameter of 1 in. and a 2-in. diameter steel container were selected for potting. The fibers were arranged so that the fiber density, defined as the total cross-section area of fibers over cross-section area of tube sheet, was uniformly about 50% (minimum of 40% to maximum of 75%) within the 2-in. diameter surface area.
2. The hollow fibers were sealed at one end using a fast-setting adhesive and then placed into the steel container in order to prevent the potting adhesive from entering the hollow fibers and plugging the lumens from the bottom of the fibers.
3. The potting adhesive was poured into the steel container that contained the hollow fibers up to the top of the container and allowed to cure. Cure was accomplished at a temperature between room temperature (25° C.) and 80° C.
4. After completion of curing, the cured potting adhesive was visually inspected for bubbling or gassing on the surface. The potted hollow fibers were visually inspected for discoloration and embrittlement.
5. After visual inspection, the potted article was removed from the steel container and cut apart for evaluation of discoloration of the internal fibers and cured potting adhesive. A microscope of 30× or greater magnification was utilized to visually inspect for lumen blockage.
6. The potted article was considered acceptable when the following conditions were met:
    A. No evidence for bubbling/out-gassing on the surface of, or within, the cured potting adhesive was detected.
    B. No discoloration or embrittlement was detected in the potted hollow fibers.
    C. No discoloration was detected in cross-sections of the cured potting adhesive.
    D. No lumen blocking was detected.

As can be seen from the discussion below, Example 1 met all of these criteria. Example 1 was tested against Comparative Example 2, a standard amine-cured bisphenol A-type epoxy resin, as follows.

Potting Application

Figure 2:
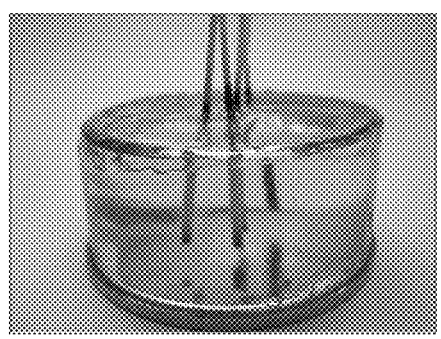
FIG. 2 depicts hollow fibers potted in the epoxy resin of Comparative Example 2.

Samples were potted using an improvised laboratory centrifugal potting device to mimic centrifugal manufacturing. Example 1 performed well. The potted fibers were free from defects with no shrinkage. Comparative Example 2 showed significant discoloration of the epoxy as well as extreme browning and discoloration of the hollow fibers. Comparative Example 2 also shrank significantly. The hollow fibers potted in the polyurethane of Example 1 are depicted in FIG. 1; and the hollow fibers potted in the epoxy resin of Comparative Example 2 are depicted in FIG. 2. Discoloration of portions of the hollow fibers of Comparative Example 2 can be seen.

Stress Simulation Test

Hollow fibers were potted into 150 grams of test material and allowed to cure for 24 hours at 60° C. Stresses encountered during typical use was simulated by manually pulling fibers vertically. Subjective evaluation of the stress response was performed by laboratory technicians. Hollow fibers potted with Example 1 showed greater flexibility than hollow fibers potted with Comparative Example 2. Hollow fibers potted with Example 1 did not fracture upon pulling, while fibers potted with Comparative Example 2 showed a significant tendency to break when pulled.

Exotherm

Cure characteristics and peak exotherm were characterized in accordance with ASTM D2471-99 Standard Test Method for Gel Time and Peak Exothermic Temperature of Reacting Thermosetting Resins. Comparison of the exotherms of Example 1 and Comparative Example 2 was conducted using a mold that was 8 inches in diameter and 2.45 inches in height. The mass of resin was 2,000 grams for each. Example 1 exhibited a peak exotherm of 65° C., while Comparative Example 2 exhibited a peak exotherm of 97° C. when tested under the same conditions.

Chemical Resistance

Chemical resistance of Example 1 and Comparative Example 2 under the following exposure conditions was evaluated:

2% sodium hydroxide (NaOH) at 60° C. (114° F.),
5% hydrochloric acid (HCl) at 23° C. (73° F.), and
6% sodium hypochlorite (NaOCl) at 23° C. (73° F.).

The test procedure was as follows. ASTM D412-06A type tensile bars were cast. The weight of the castings was measured before and after chemical exposure. Three test specimens each of cured Example 1 and cured Comparative Example 2 were placed in covered glass containers. The containers were filled with the appropriate chemical solution, and the lids tightened. The HCl and NaOCl specimens were stored in a temperature-controlled environment at 23° C. The NaOH specimens were stored in a temperature-controlled oven at 60° C. After 7, 14, and 30 days of exposure, specimens were removed from their containers, rinsed to remove the chemical solution, patted dry with paper towels, and weighed. Tensile strength and percent elongation of the test specimens was measured within 30 minutes in accordance with ASTM D412-06A using an Instron universal testing machine. The specimens were then reweighed, tested for hardness, and visually observed for degradation, discoloration, cracking, and other imperfections.

Example 1 outperformed Comparative Example 2 in colorfastness and weight change, and was comparable to Comparative Example 2 in tensile strength and percent elongation retention. Colorfastness results are summarized in Table 4; and tensile strength and percent elongation results are summarized in Table 5.

TABLE 4

COLORFASTNESS

| Chemical | Days | Example 1 | Comparative Example 2 |
|---|---|---|---|
| NaOH | 7 | Unchanged | Slightly darker, no surface attack |
|  | 14 | Unchanged | Slightly darker, no surface attack |
|  | 30 | Slightly darker, no surface attack | Moderately darker, no surface attack |
| HCl | 7 | Unchanged | Unchanged |
|  | 14 | Unchanged | Unchanged |
|  | 30 | Slightly darker, no surface attack | Unchanged |
| NaOCl | 7 | Slightly darker, no surface attack | Slightly darker, no surface attack |
|  | 14 | Slightly darker, no surface attack | Moderately darker, no surface attack |
|  | 30 | Moderately darker, no surface attack | Much darker, no surface attack |

TABLE 5

TENSILE STRENGTH AND PERCENT ELONGATION

| | Example 1 | | Comparative Example 2 | |
|---|---|---|---|---|
| Chemical | Tensile Strength (psi) | Elongation (%) | Tensile Strength (psi) | Elongation (%) |
| Control | 6700 | 4.7 | 6500 | <2.0 |
| NaOH | 6300 | 11.2 | 6400 | 11.5 |
| HCl | 6700 | 6.4 | 6600 | 6.2 |
| NaOCl | 6700 | 7.1 | 6900 | 6.7 |

Subsequent to immersion for 30 days in NaOH, HCl, or NaOCl, test specimens of Example 1 exhibited very little change in appearance and performance. Example 1 exhibited less weight change in NaOH, HCl, and NaOCl than Comparative Example 1. There did not appear to be any noticeable degradation of the elastomeric properties of any of the specimens. Based on these results, Example 1 is suitable as an adhesive for a separatory device in applications requiring periodic cleaning and sterilization in elevated temperature NaOH solutions.

Examples 4-8

Effects of Plasticizer Amount

In Examples 4-8, the amount of plasticizer DOA was varied in both Parts A and B. The results are summarized in Table 6. These examples show that a range of plasticizer levels can be used in both Parts A and B without compromising the chemical resistance and thermal properties of the product. Thus the viscosities of Parts A and B can be adjusted by varying the amount of plasticizer in each. Advantageously, the ability to adjust the viscosities of Parts A and B allows for improvements in workability and controlling the exotherm.

TABLE 6

POLYURETHANE COMPOSITIONS AND PHYSICAL PROPERTIES

| Component | Relative Amount (wt %) | | | | |
|---|---|---|---|---|---|
| | Example 4 | Example 5 | Example 6 | Example 7 | Example 8 |
| Part (A) | | | | | |
| MDI E-544 | 85.73 | 83.47 | 77.15 | 76.70 | 72.18 |
| DOA | 14.21 | 16.47 | 22.79 | 23.24 | 27.76 |
| MFP | 0.06 | 0.06 | 0.06 | 0.06 | 0.06 |
| Total Part (A) (wt %) | 100 | 100 | 100 | 100 | 100 |
| Part (B) | | | | | |
| PEP 450 | 84.20 | 81.99 | 79.77 | 75.34 | 70.91 |
| 5A | 4.76 | 4.76 | 4.76 | 4.76 | 4.76 |
| DOA | 10.96 | 13.17 | 15.39 | 19.82 | 24.25 |
| SF 8843 | 0.03 | 0.03 | 0.03 | 0.03 | 0.03 |
| UV-5411 | 0.05 | 0.05 | 0.05 | 0.05 | 0.05 |
| Total Part (B) (wt %) | 100 | 100 | 100 | 100 | 100 |
| Mix Ratio (A:B by weight) | 193:100 | 193:100 | 193:100 | 193:100 | 193:100 |
| Plasticizer in A + B (wt. %) | 8.59 | 10.11 | 13.03 | 14.69 | 17.75 |
| Physical Properties | Values | | | | |
| Viscosity of (A), 25° C. (cP) | 470 | 430 | 350 | 300 | 240 |
| Viscosity of (B), 25° C. (cP) | 2,000 | 1,800 | 1,500 | 1,000 | 500 |
| Initial mix visc., 25° C. (cP) | 1,000 | 700 | 500 | 350 | 200 |
| Work life, 25° C. (min.) | 75 | 75 | 75 | 75 | 75 |
| Shore Hardness | 78D | 77D | 76D | 74D | 71D |
| Tensile strength (psi) | 5,525 | 5,095 | 4,812 | 4,198 | 3,626 |
| Exotherm (° C./kg) | 35.5/0.2 = 177.5 | 31.1/0.2 = 155.5 | 30.8/0.2 = 154 | 29.3/0.2 = 146.5 | 27.7/0.2 = 138.5 |
| 2% NaOH Resistance at 72° C. at 1,000 hrs.[a] | +1.7[b] | +1.7[b] | +1.7[b] | +1.7[b] | +1.7[b] |
| Heat Distortion Temp. (° C.) | 96 | 96 | 93 | 91 | 90 |

[a]Weight percent gain or loss.
[b]No change in Shore hardness or tensile strength.

The use of the terms "a", "an", "the" and similar referents in the context of describing the invention (especially in the context of the following claims) is to be construed to cover both the singular and the plural, unless otherwise indicated herein or clearly contradicted by context. "Or" means "and/or." Disclosure of a narrower range or more specific group in addition to a broader range is not a disclaimer of the broader range or larger group. All ranges disclosed herein are inclusive of the endpoints, and the endpoints are independently combinable with each other. The terms "first", "second", and the like, as used herein do not denote any order, quantity, or importance, but are only used to distinguish one element from another. "Comprises" as used herein includes embodiments "consisting essentially of or "consisting of" the listed elements.

Unless defined otherwise, technical and scientific terms used herein have the same meaning as is commonly understood by one of skill in the art to which this invention belongs. A "combination" is inclusive of blends, mixtures, alloys, reaction products, and the like. As used herein, "a combination thereof includes like components not explicitly listed. The term "multi-part polyurethane composition" encompasses two-part polyurethane compositions. The terms, "part (A)" and "part (B)" are interchangeable with "first part" and "second part", respectively. As used herein, a "polyol" is an alcohol having a hydroxyl functionality of at least 2. A "tetrol" is a polyol having a hydroxyl functionality of 4. As used herein, a "polyisocyanate" is an isocyanate containing two or more isocyanate groups. An example of a polyisocyanate is a diisocyanate, which has two isocyanate groups. An isocyanate group can be abbreviated as "NCO". While a "polyurethane prepolymer" is a copolymer of a polyisocyanate and a polyol, for example a diisocyanate and a diol, a "polyurethane prepolymer composition" can comprise monomeric, dimeric, or trimeric polyisocyanates, for example isomeric diisocyanates, in addition to the polyurethane prepolymer. When used to pot fibers or wire, for example hollow fibers, the multi-part polyurethane composition can be referred to as a "potting adhesive", or "potting compound". As used herein, "room temperature" is a temperature of 25° C./77° F. When a component is defined as "absent from the composition", this means that the component was not added to, and is not present in, any of the other components added to the composition.

Any cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A multi-part polyurethane composition comprising at least a first part and a second part, wherein the first part comprises a polyurethane prepolymer composition having an NCO content of 15 to 24 wt %, based on the total weight of the polyurethane prepolymer composition; and
the second part comprises a polyol having a hydroxyl functionality of 4 to 6, and a desiccant; wherein:
the composition comprises 1 to 30; wt % of a plasticizer, based on the total weight of the composition, wherein the plasticizer is present in any one or more of the parts; and
the composition has a stoichiometry of 1:1 to 1.2:1, wherein stoichiometry is defined as the ratio of equivalents of isocyanate functionality to equivalents of hydroxyl functionality in the composition, wherein metal catalysts are absent from the composition.

2. The multi-part polyurethane composition of claim 1, wherein the polyol having a hydroxyl functionality of 4 to 6 is a liquid having a viscosity of 1 to 10,000 centipoise at 20° C.

3. The multi-part polyurethane composition of claim 2, wherein the polyol having a hydroxyl functionality of 4 to 6 is a polyether polyol having a hydroxyl functionality of 4.

4. The multi-part polyurethane composition of claim 1, wherein the multi-part polyurethane composition comprises 4 to 25 wt % of the plasticizer; and the polyol having a hydroxyl functionality 4 to 6 is the only polyol in the composition.

5. The multi-part polyurethane composition of claim 1, wherein volatile organic solvents having an initial boiling point of less than or equal to 200° C., polyester polyols, castor oil, castor oil derivatives, esters of ricinoleic acid, other polyols derived from natural oils, other polyols derived from fats, polylactones, polybutylene and polyisobutylene polyols, and polyols having amine functionality are all absent from the composition.

6. The multi-part polyurethane composition of any of claims 1, further comprising 0.01 to 0.5 wt of an amine catalyst, based on the weight of the second part.

7. The multi-part polyurethane composition of claim 1, wherein the polyurethane prepolymer composition comprises modified 4,4'-diphenylmethane diisocyanate.

8. The multi-part polyurethane composition of claim 1, wherein the plasticizer comprises an adipate ester, a phthalate ester, a phosphate ester, or a combination thereof.

9. The multi-part polyurethane composition of claim 1, wherein the desiccant comprises particulate molecular sieves.

10. The multi-part polyurethane composition of claim 1, wherein the composition further comprises an additive comprising a defoamer, a flow and leveling agent, a UV stabilizer, an antioxidant, a mold release agent, a thixotropic agent, a dispersing agent, a wetting agent, a pigment, a dye, a filler, or a combination thereof.

11. A multi-part polyurethane composition comprising a first part and a second part, wherein:
the first part comprises 70 to 92 wt % of a polyurethane prepolymer composition comprising modified 4,4'-diphenylmethane diisocyanate, having an NCO content of 15 to 24 wt % based on the total weight of the polyurethane prepolymer composition, and 8 to 30 wt % of a plasticizer comprising an adipate ester, a phthalate ester, a phosphate ester, or a combination thereof, based on the total weight of the first part;
the second part comprises 60 to 92 wt % of a polyol having a hydroxyl functionality of 4 to 6; 4 to 30 wt % of a plasticizer comprising an adipate ester, a phthalate ester, a phosphate ester, or a combination thereof, and 0.5 to 10 wt % of a particulate molecular sieve, based on the total weight of the second part; wherein:
the polyol having a hydroxyl functionality of 4 to 6 is the only polyol in the composition; and
the composition has a stoichiometry of 1:1 to 1.2:1, wherein stoichiometry is defined as the ratio of equivalents of isocyanate functionality in the first part to equivalents of hydroxyl functionality in the second part, wherein metal catalysts are absent from the composition.

12. The multi-part polyurethane composition of claim 11, wherein the first part comprises 88 to 92 wt % of the polyurethane prepolymer composition and 8 to 12 wt % of the plasticizer; and the second part comprises 80 to 92 wt % of a propoxylated pentaerythritol having a hydroxyl functionality of 4, and 4 to 9 wt % of the plasticizer.

13. A polyurethane made by mixing the first part and second part of claim 1 in a 110:40 to 90:60 volume ratio of the first and second parts respectively, or a 90:110 to 110:90 volume ratio of the first and second parts respectively, to form a polyurethane mixture, and curing the polyurethane mixture.

14. An article comprising a polyurethane made by mixing and curing the multi-part polyurethane composition of claim 1.

15. The article of claim 14, wherein the polyurethane functions as an adhesive in a separatory device.

16. The article of claim 15, wherein the article comprises a filtration module comprising membranes or hollow fibers, in which the polyurethane is in contact with the membranes or hollow fibers.

17. The article of claim 16, comprising hollow fibers potted in the polyurethane.

18. A method of forming a polyurethane comprising mixing a first part and a second part to form a mixed polyurethane composition, wherein:
the first part comprises a polyurethane prepolymer composition having an NCO content of 15 to 24 wt %, based on the total weight of the polyurethane prepolymer composition;
the second part comprises a polyol having a hydroxyl functionality of 4 to 6 , and a desiccant;
the composition comprises 1 to 30 wt % of a plasticizer, based on the total weight of the mixed polyurethane composition;
the polyol having a hydroxyl functionality of 4 to 6 is the only polyol in the composition; and
the composition has a stoichiometry of 1:1 to 1.2:1, wherein stoichiometry is defined as the ratio of equivalents of isocyanate functionality to equivalents of hydroxyl functionality in the composition, wherein metal catalysts are absent from the composition; and
curing the mixed polyurethane composition.

19. The method of claim 18, wherein the composition comprises 8 to 25 wt % of the plasticizer.

* * * * *